United States Patent
Weinert et al.

(10) Patent No.: US 7,130,520 B2
(45) Date of Patent: *Oct. 31, 2006

(54) SYSTEM HAVING CENTRALIZED CONTROL OF ACTUATORS ASSOCIATED WITH A FIBER DISTRIBUTION FRAME TO REMOTELY CONTROL ACCESS TO THE FIBER DISTRIBUTION FRAME

(75) Inventors: Stephen J. Weinert, Arlington, TX (US); Michael L. Yeilding, Fremont, CA (US); Jeffrey Lynn Langley, Blue Springs, MO (US)

(73) Assignee: SBC Knowledge Ventures, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/331,616

(22) Filed: Jan. 13, 2006

(65) Prior Publication Data

US 2006/0120682 A1 Jun. 8, 2006

Related U.S. Application Data

(63) Continuation of application No. 10/898,851, filed on Jul. 26, 2004, now Pat. No. 7,024,089.

(51) Int. Cl.
*G02B 6/46* (2006.01)
*G02B 6/44* (2006.01)

(52) U.S. Cl. ...................................... 385/135; 385/134
(58) Field of Classification Search ........ 385/134–135, 385/147; 340/542; 312/215
See application file for complete search history.

(56) References Cited

U.S. PATENT DOCUMENTS

| 3,791,714 A | 2/1974 | Maurer |
| 4,445,918 A | 5/1984 | Modone et al. |
| 4,515,612 A | 5/1985 | Burrus, Jr. et al. |
| 5,126,732 A | 6/1992 | Mardon |
| 5,274,731 A | 12/1993 | White |
| 5,540,339 A | 7/1996 | Lerman |
| 5,823,646 A | 10/1998 | Arizpe et al. |
| 6,170,928 B1 | 1/2001 | Eardley et al. |
| 6,220,059 B1 | 4/2001 | Klein et al. |
| 2005/0116819 A1 | 6/2005 | Hoffman |
| 2005/0174237 A1 | 8/2005 | Maniaci |

FOREIGN PATENT DOCUMENTS

| EP | 1182176 | 2/2002 |
| WO | WO 02 06868 | 1/2002 |

OTHER PUBLICATIONS

Database WPI Section Ch, Week 198945 Derwent Publications Ltd., London, GB; An 1989-327541, XP002238043 & JP 01 242432 A (Furukawa Electric Co Ltd), Sep. 27, 1989.

Primary Examiner—Michelle Connelly-Cushwa
(74) Attorney, Agent, or Firm—Brooks KushmanPP.C.

(57) ABSTRACT

A fiber distribution system includes a fiber distribution frame. A door is connected to the frame to open and close relative to the frame. A first actuator is associated with the door and a second actuator is associated with the frame. The actuators engage one another upon actuation to lock the door to the frame when the door is closed relative to the frame. A controller remotely controls actuation of the actuators.

18 Claims, 1 Drawing Sheet

SYSTEM HAVING CENTRALIZED CONTROL OF ACTUATORS ASSOCIATED WITH A FIBER DISTRIBUTION FRAME TO REMOTELY CONTROL ACCESS TO THE FIBER DISTRIBUTION FRAME

CROSS-REFERENCE TO RELATED APPLICATIONS

This application is a continuation of U.S. application No. 10/898,851, filed Jul. 26, 2004, now U.S. Pat. No. 7,024,089.

BACKGROUND OF THE DISCLOSURE

1. Field of the Disclosure

The present disclosure relates to fiber distribution frames and, more particularly, to a fiber distribution frame system having a centralized controller which universally controls and monitors access to fiber distribution frames.

2. Background Art

A fiber distribution frame serves as an interface between outside plant fiber optic facilities entering a central office structure and fiber optic equipment installed within that same location. The fiber distribution frame provides a centralized point for the organization and administration of the fiber optic facility and intra-building fiber equipment cables; provides a flexible platform for future fiber growth; and provides re-configurable connections between any two terminations or appearances.

In its most basic form, a fiber distribution frame is a housing, cabinet, enclosure, etc., which houses fiber optic components. Fiber optic components include fiber optic cables, jumpers, strands, connectors, etc. In general, fiber optic components extend into and out of a fiber distribution frame. A fiber distribution frame typically has a plurality of panels arranged near the front-side of the frame for enabling incoming and exiting fiber optic components to be selectively cross-connected together.

A fiber distribution frame includes at least one door which is connected by a hinge to the front-side and/or the rear-side of the frame. The door opens and closes shut in order to provide and limit access of human personnel to the panels and the fiber optic components housed within the fiber distribution frame. The fiber distribution frame may include one door for covering the entire front-side of the frame or may include a set of doors with each door for covering a respective panel. When shut, the door(s) shields the panels and the fiber optic components from the outside environment and from inadvertent or unauthorized access by human personnel.

It is desirable to limit access by human personnel to fiber distribution frames. This is so because a fiber distribution frame is essentially a deployment of optically amplified networks. As the amplification factor of the optical signals communicated by the fiber optic components deployed within a fiber distribution frame increases, so increases the potential for inadvertent exposure by human personnel to optical radiation.

Accordingly, it is desirable to maintain the door(s) of a fiber distribution frame in a locked shut configuration in order to restrict inadvertent or unauthorized access to the fiber distribution frame. At times, this may be problematic because a fiber distribution frame may have many doors and, consequently, a door may be inadvertently left open with this condition being undetected for some time. Further, there may be many fiber distribution frames scattered throughout an area. Consequently, if the door(s) of the fiber distribution frames located in remote areas are inadvertently left open, this condition may also be undetected for some time.

DETAILED DESCRIPTION OF THE DISCLOSURE

Figure 1:
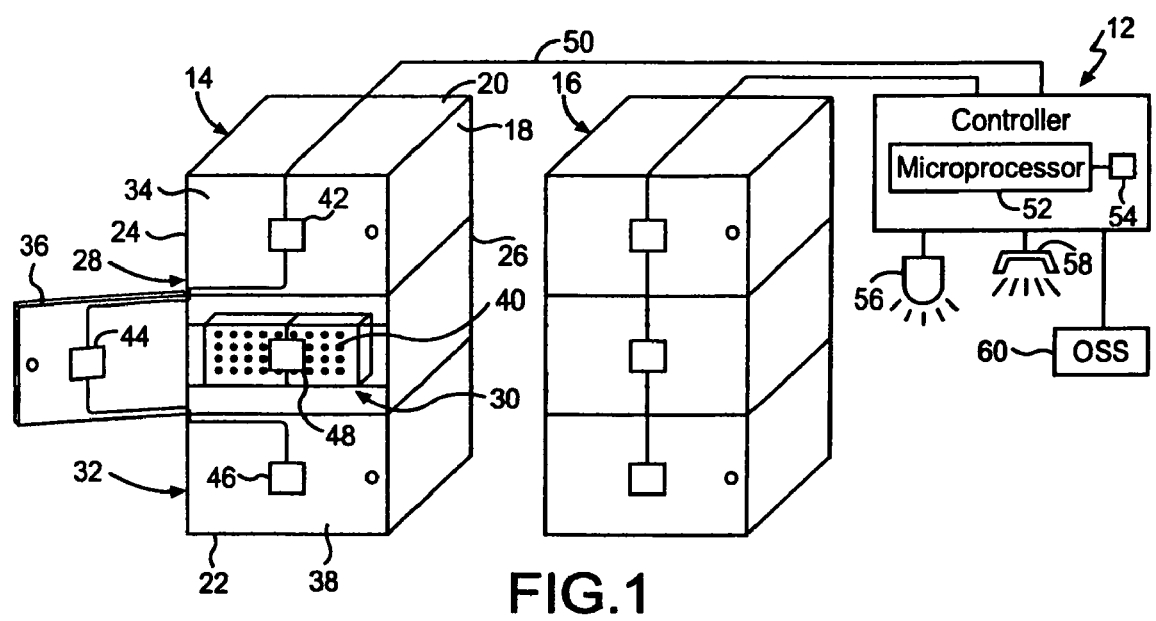
FIG. 1 illustrates a block diagram of a fiber distribution frame system in accordance with the present disclosure.

The present disclosure discloses a system having a fiber distribution frame and a panel housed within the frame. A door is connected to the frame to open and close relative to the panel when the door opens and closes relative to the frame. A first actuator is associated with the door. A second actuator is associated with the panel. The actuators engage one another upon actuation to lock the door to the frame when the door is closed relative to the frame. A controller is operable to remotely control actuation of the actuators.

The present disclosure further discloses a system having a fiber distribution frame. A door is connected to the frame to open and close relative to the frame. A first actuator is associated with the door and a second actuator is associated with the frame. The actuators engage one another upon actuation to lock the door to the frame when the door is closed relative to the frame. A controller is operable to remotely control actuation of the actuators.

The present disclosure also discloses a system having a fiber distribution frame and fiber optic component panels housed within the frame at respective positions. Doors are connected to the frame. The doors open and close relative to respective ones of the panels when the doors open and close relative to the frame. The system further includes actuator pairs. The first actuators of the actuator pairs are positioned on respective ones of the doors and the second actuators of the actuator pairs are respectively positioned on the respective panels. The first and second actuators of each actuator pair engage one another upon actuation to respectively lock the respective doors to the frame when the respective doors are closed relative to the frame. A controller is operable to remotely control actuation of the actuators.

The advantages of the fiber distribution frame system in accordance with the present disclosure are numerous. For example, the fiber distribution frame system provides an automated and mechanized means of securing "at risk" locations; provides suitable alarming; and provides visual and audible notifications of at risk locations for human optical protection.

The fiber distribution frame system in accordance with the present disclosure has a centralized controller which universally controls and monitors access to panels and doors of the fiber distribution frames present in the system. The controller enables all the doors of each fiber distribution frame to be closed and locked with the push of a button in order to prevent the panels of the fiber distribution frame from being exposed. The doors of a fiber distribution frame are universally cabled to the controller to permit the immediate lock-down of the panels in the fiber distribution frame when fiber optic components contained therein are communicating optical signals. Similarly, the controller enables the doors of each fiber distribution frame to be opened and unlocked with the push of a button in order to allow access to the panels of the fiber distribution frame.

The controller provides an office notification using both audible and visual indicators when doors of a fiber distribution frame are opened but are intended to be locked closed. The controller provides remote communication capabilities to alert other locations of the status of each door of a fiber distribution frame.

From a single push of a button (or remote access), a microprocessor of the controller transmits a relatively small amount of electrical current to operate an actuator (i.e., lock) positioned on each door of a fiber distribution frame in order to have the actuators lock shut the corresponding doors relative to the panels of the fiber distribution frame. The controller provides notification of any doors which have not been locked shut and alerts and provides alarms when a door is subsequently opened without the controller having authorized the release of the corresponding actuator.

Each actuator is an electromagnetic device which provides a positive lock to its associated door with suitable strength such that the door breaks open before the latch activator of the actuator releases upon being physically pried open. Each actuator has a unique serving address that is correlated with the physical location of the corresponding door and the corresponding fiber distribution frame. The serving addresses are programmed in at the controller.

The actuators associated with the doors of a fiber distribution frame are connected to the controller through a daisy chain arrangement. The use of a constant flow of current (i.e., direct current) from the controller to the actuators keeps the actuators charged and in the closed and locked position. The doors open normally when the controller releases the current. The opening of any one door does not disable the actuators of the remaining doors which are activated.

The aspects of the fiber distribution frame system in accordance with the present disclosure are as follows: actuators (i.e., locks) are positioned on corresponding doors of a fiber distribution frame and the actuators are actuated to lock the doors to the fiber distribution frame in response to a command from a central location (i.e., the controller); the controller has one button lock and unlock control; the controller provides identification of each door that has been opened; each actuator requires a relatively large amount of strength to open; the system provides protection within the confines of the door designs; the system provides alarm notification both locally and through remote transmission to operation support system (OSS) centers; and the system meets the security solutions for Optical Hazard Levels 3a, 3b, and 4 as described in the American National Standards Institute (ANSI) and the International Electrotechnical Commission (IEC).

The fiber distribution frame system in accordance with the present disclosure is intended to augment existing panels and doors of a fiber distribution frame with the ability to secure the fiber distribution frame with the touch of a button. In addition, the fiber distribution frame system provides the ability to release the doors of a fiber distribution frame from a single point or remotely.

In sum, the fiber distribution frame system in accordance with the present disclosure provides an automated and mechanized means to physically and automatically lock the doors of a fiber distribution frame; generate alarms regarding the status of unlocked and opened doors; report the alarms remotely; and set off audible and light alarms when the doors are not locked closed (i.e., when the panels of the fiber distribution frame are not secured). Using the discrete ability with the microprocessor controlled devices, the fiber distribution frame system in accordance with the present disclosure identifies any doors of a fiber distribution frame which are opened.

The cabling connecting the door actuators of a fiber distribution frame to the controller is routed via one loop from actuator-to-actuator thereby obviating the need for individual cables between each actuator and the controller. Of course, individual cabling between the controller and the actuators is also a suitable cabling arrangement if so desired. However, the key is to provide a cabling arrangement that overlays a set of panels of a fiber distribution frame and does not displace space for wiring and cabling that is required for the fiber optic components housed within the fiber distribution frame. As such, the daisy chain cabling arrangement provided by having one loop connect the actuators to the controller is preferable.

The product (i.e., the actuators, the controller, etc.) in accordance with the present disclosure can be used with any bay, relay rack, or shelf that has fiber optic appearances whether the high power signal is in a central office, a building or structure, or even at a customer's premises.

Referring now to FIG. 1, a fiber distribution frame system 10 in accordance with the present disclosure is shown. Fiber distribution frame system 10 generally includes a controller 12 and a plurality of fiber distribution frames 14, 16. Only two fiber distribution frames 14, 16 are shown in FIG. 1. It is to be appreciated that there may be any number of fiber distribution frames in system 10.

Each fiber distribution frame 14, 16 generally includes the same elements. As such, only fiber distribution frame 14 will be described in further detail. Fiber distribution frame 14 includes a frame 18 having top and bottom surfaces 20 and 22 and two side surfaces 24 and 26. Surfaces 20, 22, 24, and 26 form the outlining segments of an enclosure, cabinet, chassis, etc., which has an exposed front-face.

Frame 18 is divided up into compartments 28, 30, and 32. Compartments 28, 30, and 32 generally house fiber optic components therein. Frame 18 may have any number of compartments. For each compartment 28, 30, and 32, a respective door 34, 36, and 38 is connected by a hinge or the like to side surface 24 of frame 18. Doors 34, 36, and 38 open and close with respect to the corresponding compartment 28, 30, and 32. Doors 34 and 38 are shown in FIG. 1 as being shut closed. As such, doors 34 and 38 are shown in FIG. 1 as secluding compartments 28 and 32 from the outside environment and thereby limiting access to fiber optic components contained therein. Door 36 is shown in FIG. 1 as being opened. As such, door 36 is shown in FIG. 1 as exposing compartment 30 to the outside environment and thereby allowing access to fiber optic components contained therein.

Each compartment 28, 30, and 32 has a corresponding panel extending across its front side between side surfaces 24 and 26 of frame 18. Panel 40 in compartment 30 is shown in FIG. 1. Because door 36 is opened, panel 40 is exposed to the outside environment and may be accessed by human personnel. Like the other panels in compartments 28 and 32, panel 40 is a fiber optic component panel which interconnects fiber optic components contained within frame 18.

In accordance with the present disclosure, compartments 28, 30, and 32 are respectively associated with electromagnetic actuators (i.e., locks) 42, 44, and 46. Actuators 42, 44, and 46 are respectively positioned on doors 34, 36, and 38 of the corresponding compartments 28, 30, and 32. Actuators 42, 44, and 46 each include complementary actuator elements which are positioned on the panels of the corresponding compartments 28, 30, and 32. For example, actuator element 48 which is complementary to actuator 44 is shown in FIG. 1 as being positioned on panel 40 in compartment 30. Actuators 42, 44, and 46 with their complementary actuator elements function to lock shut corresponding doors 34, 36, and 38. That is, upon being actuated, actuators 42, 44, and 46 meet with their complementary actuator elements to lock doors 34, 36, and 38 when the doors are shut closed relative to frame 18.

To this end, actuators 42, 44, and 46 are connected in a daisy chain arrangement by a cable 50 to controller 12. Controller 12 is generally operable to actuate actuators 42, 44, and 46 in order to lock doors 34, 36, and 38 closed. Controller 12 includes a microprocessor 52 which transmits electrical current to actuators 42, 44, and 46 via cable 50 in order to actuate the actuators upon a push of a button 54. Likewise, through the push of button 54, controller 12 cuts the electrical current to actuators 42, 44, and 46 via cable 50 in order to unlock the actuators.

Actuators 42, 44, and 46 each have a corresponding serving address. The serving addresses correspond to the doors 34, 36, and 38 and the physical location of frame 18. The serving addresses are programmed in at controller 12. Controller 12 uses the serving addresses in order to individually control and monitor the actuation of actuators 42, 44, and 46. For example, controller 12 transmits a control signal having the serving address of actuator 44 over cable 50. Each actuator 42, 44, and 46 receives this control signal as each actuator is connected to cable 50. However, actuators 42 and 46 disregard the control signal as the control signal does not have their serving addresses. Likewise, actuator 44 acts upon the control signal as the control signal has its serving address. As an example, the control signal transmitted by controller 12 contains the command for actuator 44 to unlock. In turn, actuator 44 unlocks in order to allow door 36 to be opened for access to panel 40 and compartment 30. Upon actuator 44 unlocking, the remaining actuators 42 and 46 are still maintained in the locked configuration.

Controller 12 is operable to monitor which actuators 42, 44, and 46 are unlocked and locked. Controller 12 is further operable to monitor which actuators 42, 44, and 46 are unlocked when these actuators are intended to be locked. To this end, actuators 42, 44, and 46 communicate status information to controller 12 via cable 50. The status information from an actuator includes the serving address of the actuator and the actuated status of the actuator.

In the event that an actuator is unlocked when it should be locked, controller 12 generates alarms to alert human personnel. Controller 12 includes a light 56 for generating a visual alarm for human personnel to see and further includes a speaker 58 for generating an audible alarm for human personnel to hear. Controller 12 activates alarms 56 and 58 upon at least one of actuators 42, 44, and 46 being unlocked when these actuators are intended to have been locked. As such, controller 12 activates alarms 56 and 58 upon at least one of doors 34, 36, and 38 being opened when these doors are intended to have been locked closed. In sum, controller 12 provides alerts when any of doors 34, 36, and 38 are subsequently opened without the controller having given the proper release of the corresponding actuators 42, 44, and 46.

Controller 12 remotely communicates with an operation support system (OSS) 60 to provide the OSS with alerts regarding actuators and doors which are not locked. The alerts generated by controller 12 contain identification of doors 34, 36, and 38 which have been opened or unlocked (or closed and locked).

Controller 12 provides a constant current (i.e., direct current) to actuators 42, 44, and 46 via cable 50 in order to keep the actuators charged and in the closed and locked position. When controller 12 releases the current, actuators 42, 44, and 46 unlock in order to unlock corresponding doors 34, 36, and 38. Controller 12 also has the ability to use a force C relay in a circuit to all actuators 42, 44, and 46 that closes an alarm circuit relay when the current is cut. When the current is replaced, the relay operates and releases from the alarm side.

The illustrations of embodiments described herein are intended to provide a general understanding of the structure of various embodiments, and they are not intended to serve as a complete description of all the elements and features of methods and apparatuses that might make use of the structures described herein. Many other embodiments will be apparent to those of skill in the art upon reviewing the above description. Other embodiments may be used and derived therefrom, such that structural and logical substitutions and changes may be made without departing from the scope of this disclosure. The Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a fiber distribution frame;
   a fiber optic component panel housed within the frame;
   a door connected to the frame to open and close relative to the panel when the door opens and closes relative to the frame;
   a first actuator associated with the door, wherein the first actuator is an electro-magnetic actuator;
   a second actuator associated with the panel, wherein the actuators engage one another upon actuation to lock the door to the frame when the door is closed relative to the frame; and
   a controller operable to remotely control actuation of the actuators.

2. The system of claim 1 wherein:

the first actuator is positioned on the door and the second actuator is positioned on the panel.

3. A system comprising:

a fiber distribution frame;

a door connected to the frame to open and close relative to the frame;

a first actuator associated with the door, wherein the first actuator is an electro-magnetic actuator;

a second actuator associated with the frame, wherein the actuators engage one another upon actuation to lock the door to the frame when the door is closed relative to the frame; and a controller operable to remotely control actuation of the actuators.

4. The system of claim 3 wherein:

the first actuator is positioned on the door.

5. The system of claim 3 wherein:

the second actuator is positioned on the frame.

6. The system of claim 3 wherein:

the first actuator is positioned on the door and the second actuator is positioned on the frame.

7. The system of claim 4 wherein:

the controller transmits an electrical current signal to at least one of the actuators to actuate the actuators.

8. The system of claim 7 wherein:

the controller cuts off the electrical current signal transmitted to the at least one of the actuators to un-actuate the actuators.

9. The system of claim 3 wherein:

at least one of the actuators communicates a status signal regarding actuation status of the actuators to the controller;

wherein the controller determines the actuation status of the actuators in response to the status signal.

10. The system of claim 9 wherein:

the controller generates an alert when the actuators are intended to be actuated but are un-actuated.

11. The system of claim 10 wherein:

the alert is a visual alert for human personnel to see.

12. The system of claim 10 wherein:

the alert is an audio alert for human personnel to hear.

13. The system of claim 9 wherein:

the controller uses the actuation status of the actuators to determine if the door is opened while the actuators are actuated.

14. A system comprising:

a fiber distribution frame;

a plurality of fiber optic component panels housed within the frame at respective positions;

a plurality of doors connected to the frame, wherein the doors open and close relative to respective ones of the panels when the doors open and close relative to the frame;

a plurality of electro-magnetic actuator pairs, wherein the first actuators of the actuator pairs are positioned on respective ones of the doors and the second actuators of the actuator pairs are respectively positioned on the respective panels, wherein the first and second actuators of each actuator pair engage one another upon actuation to respectively lock the respective doors to the frame when the respective doors are closed relative to the frame; and a controller operable to remotely control actuation of the actuators.

15. The system of claim 14 wherein:

each actuator pair has a serving address;

wherein the controller uses the serving addresses to selectively control actuation of the actuators.

16. The system of claim 14 wherein:

at least one actuator of each actuator pair communicates a status signal regarding the actuation status of the actuator pair to the controller, the status signal including the serving address of the actuator pair;

wherein the controller determines actuation status of the actuator pairs in response to the status signals and identifies which actuators are actuated and un-actuated by using the serving addresses contained in the status signals.

17. The system of claim 14 wherein:

the controller monitors actuation status of the actuators to determine if any of the doors are opened when the corresponding actuators have been actuated.

18. The system of claim 14 wherein:

the controller and one of the first and second actuators of each actuator pair are connected together in a daisy chain arrangement.

* * * * *